US010095677B1

(12) United States Patent
Manohar et al.

(10) Patent No.: US 10,095,677 B1
(45) Date of Patent: Oct. 9, 2018

(54) DETECTION OF LAYOUTS IN ELECTRONIC DOCUMENTS

(71) Applicant: Amazon Technologies, Inc., Reno, NV (US)

(72) Inventors: Vasant Manohar, Chennai (IN); Eric Allen Menninga, Seattle, WA (US); Ashley Alonzo Ricardo Karl Mitchell, Seattle, WA (US); Joseph King, Seattle, WA (US); Mugunthan Govindaraju, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 1074 days.

(21) Appl. No.: 14/316,704

(22) Filed: Jun. 26, 2014

(51) Int. Cl.
G06F 17/00 (2006.01)
G06F 17/24 (2006.01)

(52) U.S. Cl.
CPC .................. G06F 17/245 (2013.01)

(58) Field of Classification Search
CPC .... G06F 17/245; G06F 17/248; G06F 17/243; G06F 17/2211; G06F 17/2288; G06F 17/24
USPC .......................................................... 715/227
See application file for complete search history.

(56) References Cited

U.S. PATENT DOCUMENTS

| 8,724,907 | B1 * | 5/2014 | Sampson | G06K 9/6255 382/209 |
| 2004/0139384 | A1 * | 7/2004 | Lin | G06F 17/2264 715/261 |
| 2009/0265363 | A1 * | 10/2009 | Lai | G06Q 10/10 |
| 2011/0137900 | A1 * | 6/2011 | Chang | G06F 17/30707 707/737 |
| 2011/0197121 | A1 * | 8/2011 | Kletter | G06F 17/2211 715/234 |
| 2011/0276874 | A1 * | 11/2011 | Dejean | G06F 17/243 715/243 |
| 2012/0110438 | A1 * | 5/2012 | Peraza | G06F 17/214 715/243 |
| 2013/0191366 | A1 * | 7/2013 | Jovanovic | G06K 9/00469 707/710 |

FOREIGN PATENT DOCUMENTS

EP 1748365 A1 * 1/2007 ........... G06F 17/218

* cited by examiner

Primary Examiner — Scott Baderman
Assistant Examiner — Jason Edwards
(74) Attorney, Agent, or Firm — Lee & Hayes, PLLC

(57) ABSTRACT

Disclosed are techniques and systems to detect a layout of a source document. A process may include receiving content from a first page and a second page of the source document, designating sections in each page along a first direction of the page, and assigning similar sections to a group. For the group, the process may proceed by dividing sections for each page into discrete portions associated with 2D coordinate areas, and identifying sets of 2D coordinate areas for the discrete portions that contain content. The number of times each portion contains some content may be compared to a threshold to determine a layout of the group of sections.

20 Claims, 11 Drawing Sheets

DETECTION OF LAYOUTS IN ELECTRONIC DOCUMENTS

BACKGROUND

Publishers and designers use layout as a means to grab and maintain a reader's attention so that the reader may become interested in the published content. When published documents (e.g., newspapers, magazines, textbooks, research papers, etc.) are in electronic form, they may be viewed on various types of electronic devices. These electronic devices can take on a variety of forms (e.g., personal computers, electronic book readers, smart phones, etc.), each having different display screen sizes, display resolutions, display orientations, and the like, which may dictate the viewing experience of the user. For example, smaller viewing devices may have a limited screen size or resolution for displaying electronic documents. Accordingly, when documents are rendered on such a devices, the original layout may not be easily displayed or even replicated properly. This may result in losing the content creator's design intent and/or result in a diminished reading experience for the user of the viewing device. Other constraints such as user preferences (e.g., font size preference) may further dictate how electronic documents are rendered on a viewing device.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
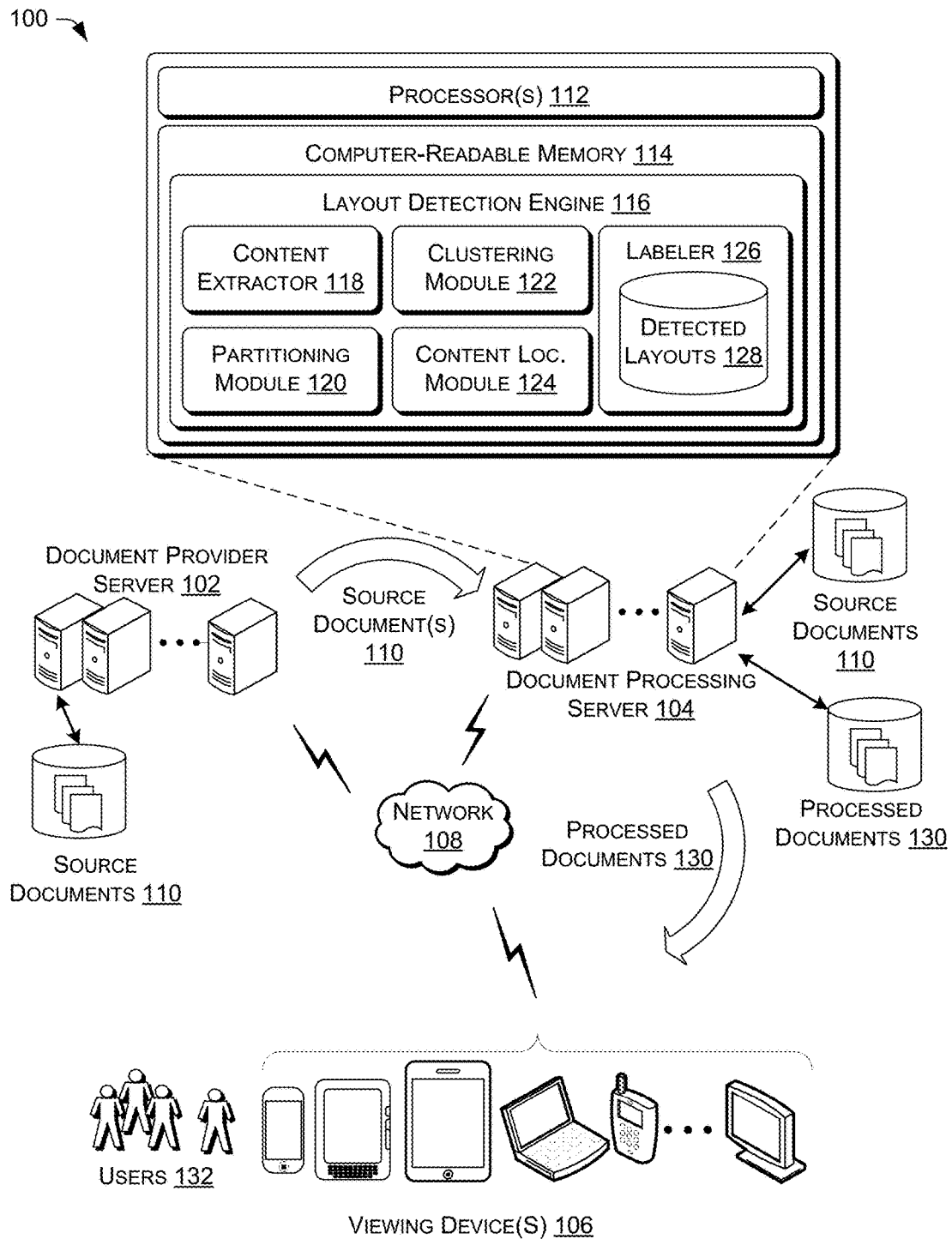
FIG. 1 is a schematic diagram of illustrative system 100 that includes various computing devices that enable layout detection of electronic documents.

This disclosure is directed to techniques and systems to detect a layout of an electronic document. The techniques and systems enable an accurate reproduction (e.g., preserving the design intent of the content creator) of electronic documents across a variety of viewing devices due to the ability to adapt the detected layout to different viewing device. By detecting a source layout(s) of the electronic document, the original design intent of the content creator in terms of an arrangement and style of content within the electronic document may be preserved, or at least be preserved more than previous approaches allowed, when adapting or otherwise changing the source layout to accommodate different viewing devices (e.g., different input components, display screen sizes, display screen resolutions, etc.). As a result, a user's reading experience across a variety of viewing devices may be enhanced.

In some embodiments, a process of detecting a layout in an electronic document having multiple pages may include receiving first content from a first page and second content from a second page of a source document, and for each page, designating a first section and a second section of the page along a first direction of the page, and assigning the first section from the first page and the first section from the second page to a first group. For the first group of similar sections, the process may further include dividing the first section of the first page into first and second discrete portions and dividing the first section of the second page into third and fourth discrete portions, the first and third discrete portion associated with a first two-dimensional (2D) coordinate area of a display and the second and fourth discrete portion associated with a second 2D coordinate area of the display. This dividing creates a 2D matrix that may be utilized as a map to locate the first and second content within the 2D matrix by determining whether the first discrete portion and the second discrete portion, individually, would contain at least some of the first content and whether the third discrete portion and the fourth discrete portion, individually, would contain at least some of the second content. The process may further include designating the first 2D coordinate area as part of a layout of the first group if a number of times that the first and third discrete portions contain at least some of the first and second content meets or exceeds a threshold, and this is repeated for the second 2D coordinate area with respect to the second and fourth discrete portion to determine whether to designate the second 2D coordinate area as part of the layout of the first group. The process may further include associating the layout with the first section of the first page and with the first section of the second page.

In some embodiments, the layout detection process may iterate through the source document to detect further layouts when multiple layouts are present. In some embodiments, the detection of multiple layouts within the document may be performed on a single-pass through the source document. Systems and computer-readable media are also disclosed herein for carrying out the layout detection process.

The techniques and systems described herein may be implemented in a number of ways. Example implementations are provided below with reference to the following figures.

Illustrative System

FIG. 1 is a schematic diagram of illustrative system 100 that includes various computing devices that enable layout detection of an electronic document. The system 100 may include a document provider server(s) 102, a document processing server(s) 104, and a viewing device(s) 106, each in communication via one or more network(s) 108. The network 108 is representative of many different types of networks, and may include wired and/or wireless networks such as cable networks, the Internet, local area networks (LANs), wide area networks (WAN), mobile telephone networks (MTNs), and other types of networks, possibly used in conjunction with one another. Although embodiments are described in the context of a web based system, other types of client/server-based communications and associated application logic could be used.

The document provider server 102 may be hosted by any provider entity, such as a content creator (e.g., author), publisher, or an intermediary. The source documents 110 may be created in, or converted to, digital form (i.e., electronic documents). That is, the source documents 110 may be created electronically (e.g., using word processing software) or alternatively scanned or otherwise converted from physical printed media to electronic form. In some cases, the source documents 110 may represent published, or to-be-published, works that are often intended for print publication, such as textbooks, cookbooks, research papers, and the like. "Electronic documents" and "digital documents" are sometimes used interchangeably herein to refer to the source documents 110 in electronic form. Electronic documents are configured to be displayed on an electronic device, such as the viewing device 106, for viewing thereon.

In some embodiments, the source documents 110 may include books (e.g., textbooks, cookbooks, etc.), magazines, newspapers, newsletters, manuals, guides, references, articles, reports, documents, or any other suitable paginated document. Moreover, the source documents 110 may include fixed or reflowable content. Fixed content, or fixed format content, is meant to encompass a source document 110 having content laid out in a fixed manner on each page of the source document 110, meaning that the content on each page is of a predefined size in predefined locations. In this scenario, the content creator (e.g., author) and/or publisher may specify the layout and style of the source document 110 in terms of how it should look when printed. For example, characteristics such as the font type, color of text, as well as the arrangement of content on a page may be specified through the use of style guides and grids used as guidelines for publishing purposes of the original content. Such style guides are invisible to the end-user/reader.

The content on the page(s) of the source documents 110 may include text, images (e.g., photographs, drawings, etc.), tables, charts, graphs, captions, and the like. In scenarios where the source documents 110 are created electronically (as opposed to electronic documents that have been scanned-in from a physical copy), the content may further include interactive and/or dynamic elements such as graphics, video, interactive text (e.g., hyperlinks), and the like. It is to be appreciated that the source documents 110 may comprise a single page or multiple (e.g., hundreds) of pages.

In some embodiments, the document provider server 102 may transmit source documents 110 in digital form (i.e., electronic documents) to the document processing server 104 via the network 108. For example, the source document 110 may be a textbook created by an author(s), and the author, or another entity, may utilize suitable hardware (e.g., a document scanner) to scan the textbook so that it may be converted from a physical hardcopy to electronic form, such as portable document format (PDF) created by Adobe Systems®. In some embodiments, the source documents 110 may be transmitted in other suitable formats, including reflowable text formats such as hypertext markup language (HTML), electronic publication (EPUB), and the like. At least some of the content may be text-based content that may be stored, and recognized as, text through techniques such as optical character recognition (OCR), human designation, or by other known techniques. In some cases, however, text-based content may be created in custom typeface or fonts to represent more complex elements such as mathematical or scientific equations, symbols, etc. In these scenarios, some text-based content may be embedded in the document in an image format, such as raster graphic image format (e.g., bitmap, JPEG, etc.), scalable vector graphics (SVG) format, and the like.

The document processing server 104 may be maintained and operated by an entity such as an electronic book (e-book) retailer or distribution service. It is to be appreciated that the document provider server 102 and the document processing server 104 may be maintained and operated by the same entity or different entities. In some embodiments, the document processing server 104 may obtain or otherwise generate its own source documents 110 in electronic form "in-house," such as by scanning physical hard copies of source documents 110 to generate electronic versions of the source documents 110. Additionally, or alternatively, the document processing server 104 may receive the source documents 110 from the document provider server 102 via the network 108. In either case, the source documents 110 are provided to the document processing server 104 as an input for further processing to detect a layout of the source documents 110, as described in further detail below. As mentioned above, any style guides used by the content creator for layout purposes of the source documents 110 are invisible to the end user, and even to the document processing server 104 in the system 100, such that the layout is to be detected (i.e., reverse engineered) for utilization in downstream processes or applications.

As illustrated, the document processing server 104 is equipped with one or more processors 112 and one or more forms of computer-readable memory 114. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computer-readable memory 114 may be used to store any number of functional, or executable, components, such as programs and program modules that are executable on the processor(s) 112 to be run as software. Each component stored in the computer-readable memory 114 may comprise computer-executable instructions that, when executed, cause the one or more processors 112 to perform acts and to implement techniques described herein. Each component may be in the form of data structures, program modules, or other data. In some embodiments, the computer-readable memory 114 may include a layout detection engine 116, which may facilitate detection of layout of the input source documents 110 received at the document processing server 104, among other related operations. The layout detection engine 116 may include a number of components, modules, and/or logic for performing the actions described herein. For instance, the layout detection engine 116 may include a content extractor 118, a partitioning module 120, a clustering module 122, a content location module 124, and a labeler 126 with access to detected layouts 128 that are ultimately associated with the output by the layout detection engine 116.

The content extractor 118 may be configured to receive content by, for example, extracting content from an input source document 110. A source document 110 may comprise one or more pages of content, which may be embodied in different forms including text, images, and the like. The content is visually identifiable to the human eye and discernible from a background of a page by the nature of the content being printed on physical media (e.g., paper). Moreover, a source document 110 in electronic form, such as a PDF document, contains an embedded structure of the content of the source document 110 in terms of text (e.g., letters), images, and even metadata (e.g., font characteristics of the text-based content). Accordingly, content in the source document 110 may be identified and extracted by the content extractor 118 so that its location on the page and the overall layout of the content may ultimately be determined. Any suitable technique may be used for content extraction, including OCR, human designation, or other known techniques. In some embodiments, the content extractor 118 may further group text-based content into words and lines, enabling detection of line breaks and basic spatial location of the textual content.

The partitioning module 120 may be configured to designate sections in the source document 110, and/or among the content within the source document 110, in a variety of ways. In some embodiments, the partitioning module 120 is configured to designate sections in the source document 110 along a lengthwise direction of document's pages. For instance, a division may naturally be determined at each page break, and/or using additional heuristics to determine potential section breaks. In some embodiments, line spacing is analyzed to determine if there is a predominant distance between lines on a page where any deviation from that predominant line spacing may be indicative of a section break point. Other cues may be utilized to detect breaks, such as font characteristics, keywords (e.g., chapter), and the like. Often, content creators will denote different sections within the source document 110 by using different layouts for sequential sections. In this manner, designating sections in the source document 110 by traversing the source document 110 along a lengthwise direction of the document's pages may be useful in demarcating different potential layouts within the source document 110 so that the different potential layouts may be grouped together based on similarity for layout detection purposes.

In some embodiments, the partitioning module 120 may be further configured to identify certain layout-based characteristics of the content in the source document 110 that may be used for other downstream processes, such as clustering. For example, the partitioning module 120 may be configured to estimate a number of columns on a page or section of the source document 110, as well as the dimensions of the identified columns. In some instances, the partitioning module 120 may determine breaks (e.g., gutters, margins, etc.) along a widthwise direction of a page in the source document 110 that may enable the estimation of a number of columns of content (e.g., text-based content). In either or both of the lengthwise or widthwise directions of a page, breaks may be known (predetermined, etc.), identified as vertical white spaces (or gaps) within the pages of the source document 110, or determined based on cues (known shapes, indents, font characteristics, keywords, etc.) using heuristics. Columnar dimensions (width and length) may be estimated or otherwise determined from the page size of the pages in the source document 110 (e.g., A4, A5, B4, B5, etc.) and/or margin settings when available.

The clustering module 122 may be configured to associate (e.g., cluster or categorize) the sections identified by the partitioning module 120 into one or more groups according to a similarity measure between the sections. In some embodiments, a suitable similarity measure may be the number of columns estimated by the partitioning module 120 and the dimensions of the columns identified. For example, sections within the source document 110 that include the same number of columns with the same or similar dimensions may be clustered into the same group. Being that a number of columns is directly correlated with the layout of the content in the source document 110, the number of columns is a suitable similarity measure used for grouping sections together that are likely to have the same, or at least a similar, layout. Other similarity measures may be used without changing the basic characteristics of the system. Furthermore, any suitable clustering algorithm hierarchical, k-means, etc., may be used for determining suitable parameters (e.g., ranges of columnar dimensions for each cluster) by which the sections of the source document 110 may be grouped together.

The content location module 124 may be configured to locate the content within the source document 110 as it is laid out on each section within the document. More specifically, the content location module 124 may divide the pages of the source document 110, and hence the sections of each page, into discrete portions. This division causes the creation of a grid or a 2D matrix spanning a page size, such as A4 (ISO-216), of the pages in the source document 110. The 2D matrix comprises multiple cells (i.e., the discrete portions) that may be associated with 2D coordinate areas (e.g., X and Y coordinate areas) of a display onto which the page of the source document 110 are to be presented, and the cells may be at any suitable density within the 2D matrix. In some embodiments, the resolution of the 2D matrix may correspond to a pixel, or group of pixels, defined by a standard resolution used in image format creation, such as dots per inch (DPI) or pixels per inch (PPI). In one illustrative example, the cell density may correspond to a dot density between the range of 72 DPI to 300 DPI.

In order to determine where the content in the source document 110 lies within the 2D matrix, the content location module 124 may identify a subset of the 2D coordinate areas that contain the extracted content, and register a "count" for each one of those cells that contain at least some of the content when an individual section is processed. This may be accomplished by using a counter associated with each cell that may be incremented for every section of the source document 110 that contains at least some of the extracted content in those cells. This process may be carried out with a 2D matrix for each group of sections that were clustered together in the same "bin" to obtain a final value (a sum of a number of times that an individual cell would contain at least some of the extracted content from the pages/sections being processed when they are presented on the display) after all sections are processed in a group. Sections with potentially similar layouts may be clustered and processed with an associated 2D matrix, thereby removing possible noise from other detectable layouts in the source document 110 that might be clustered in other bins.

In some embodiments, different content types (i.e., text, images, etc.) may be assigned different weights to give a better indication of layout in terms of content type in the document. For example, text, especially main content flow text, may be assigned a higher weight (e.g., 3 times the weight) than a weight assigned to other content, such as image or graphic-based content, that may have a smaller influence on the layout to be detected in the source document 110. That is, text-based content, especially main content flow text, may be more indicative of layout than other types of content, at least in some scenarios. Whether different content types carry different weights or the same weight, the values of respective cells of the 2D matrix may be incremented for every section where the extracted content occurs within those respective cells as the sections are examined or processed. After all of the sections, or some minimum number of the sections, are traversed, the cells of the 2D matrix will have respective values (sums of a number of times that at least some of the extracted content would be contained in the cell when the respective pages are presented on a display) associated therewith that are indicative of where the extracted content is predominantly located (or laid out) across the designated sections of the source document 110. It is to be appreciated that "incrementing" counts for each cell may be embodied or visualized in any suitable manner. For instance, the incremented value for each cell could take the form of a number, color density (i.e., cell intensity ranging from total absence at zero "black" to total presence at 255 "white" for an 8-bit image), or any suitable visual or machine-readable indicator to denote higher or lower relative counts that represent a number of times throughout the source document 110 that content is located within a particular cell of the 2D matrix.

In some embodiments, the content location module 124 may be further configured to compare the final count value for each cell to a threshold after the cells within the 2D matrix have been incremented. Comparing against such a threshold may enable a layout to be determined by removing outlier cells from consideration in determining the boundary of main flow content to be designated as the layout. Any suitable thresholding may be used to threshold the 2D matrix, such as applying a fixed threshold, a dynamic threshold, Otsu's algorithm, or a similar algorithm. In some embodiments, a dynamic threshold taken as the median value of the incremented cells of the 2D matrix may be used as the threshold to remove from consideration cells with values at or below the threshold and maintain the cells with values that meet or exceed the threshold. A binary label may be assigned to each cell to designate those cells with final values or sums that meet or exceed the threshold. In some embodiments, the content location module 124 may further utilize refinement techniques (e.g., comparing to a second threshold) to improve the content boundary determination.

The labeler 126 may be configured to associate (e.g., map) the detected layout 128 to the sections designated in the source document 110 to identify, and label, the pages of the source document 110 with the best fitting detected layout(s) 128. In this manner, all of the pages in the source document 110 may be labeled with at least one detected layout 128. Where the source document 110 contains multiple layouts, each layout may be detected and used by the labeler 126 to label the multiple pages in the source document 110 with multiple different layouts.

The layout detection engine 116 may generate a data file that represents processed documents 130 after the input source documents 110 have been processed to determine layout. As such, the processed documents 130 may include information pursuant to the layout detection process that was carried out by the layout detection engine 116, such as the sections designated within the processed documents 130, and the detected layout(s) 128 tagged to each page of the processed documents 130. In other words, the processed documents 130 may be represented in a suitable format or construct to be stored and/or transmitted for further downstream processing.

In some embodiments, the document processing server 104 may transmit the processed documents 130 to the viewing device 106 for viewing by users 132. The association of the layout(s) 128 with the processed document 130 may be in the form of metadata of the processed document 130, tags, or any other suitable mechanism for attaching or associating information about the layout 128 to the processed document 130.

In some embodiments, the viewing device 106 may comprise a personal computer, an e-book reader, a tablet computer, a mobile (smart) telephone, a personal digital assistant (PDA), a television, a set top box, a gaming console, or another electronic device. The viewing device 106 may be capable of receiving the processed document 130 and causing the display of the processed document 130 on a display device. In some embodiments, the process of displaying the processed document 130 on the viewing device 106 involves adapting the detected layout(s) 128 to a different layout suitable for the constraints of the viewing device 106. The viewing device 106 may include a browser, an application (e.g., e-book reader application), or any suitable program to enable viewing the processed document 130. In some embodiments, the application or program that causes rendering of the processed document 130 on the viewing device 106 may be executed locally on the viewing device 106 or remotely (with respect to the viewing device 106) on the document processing server 104.

Figures 2A, 2B:
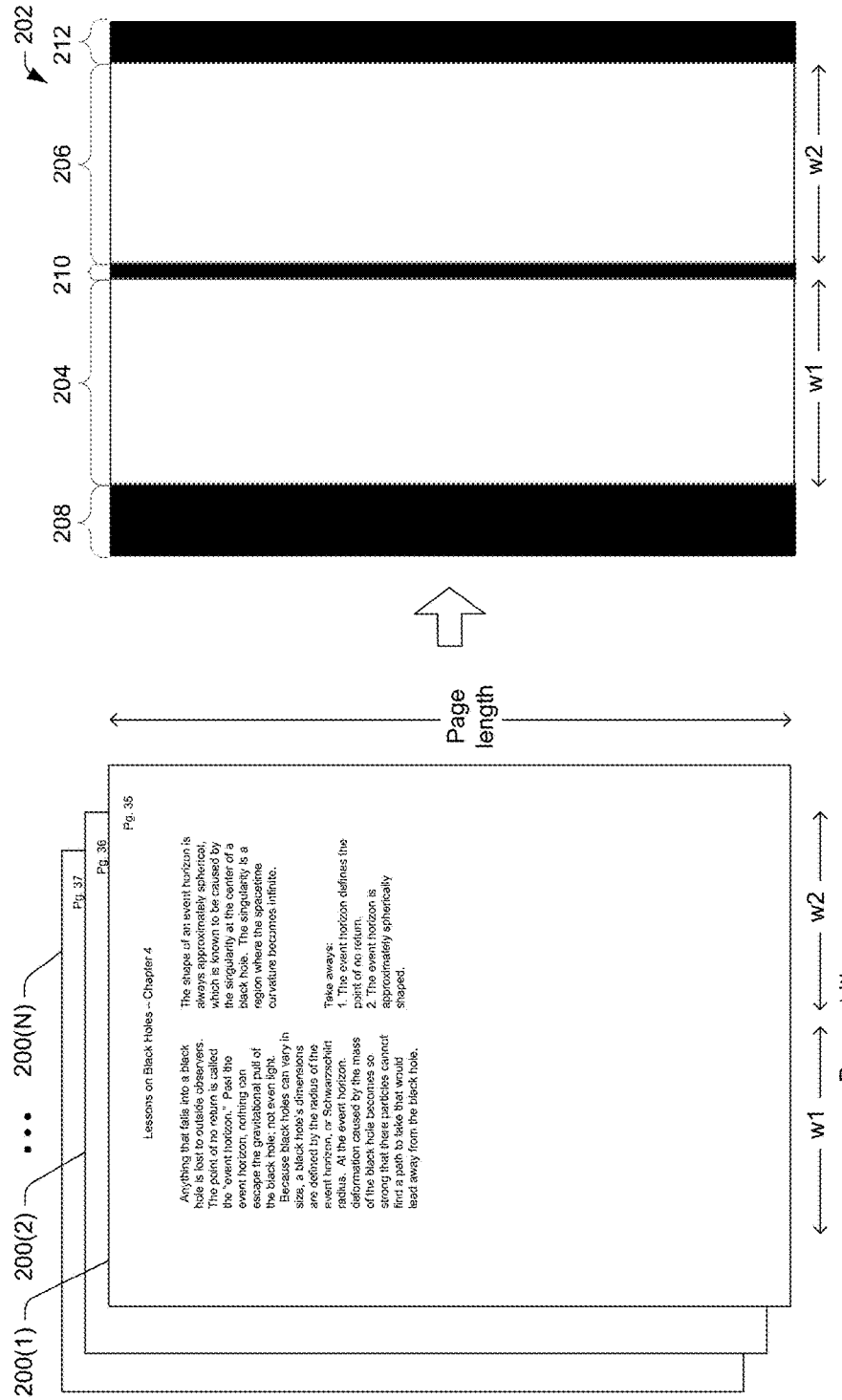
FIG. 2A illustrates a plurality of example sections of an example input document that may be processed by a layout detection engine to determine a layout among the sections.
FIG. 2B illustrates an example frame that may be used for layout detection of a section.

FIG. 2A illustrates a plurality of example sections 200(1), 200(2), . . . , 200(N) of an example input source document 110 that may be processed by the layout detection engine 116 to determine a layout among the sections 200(1)-(N). The plurality of sections 200(1)-(N) may be generated by the partitioning module 120, as described above, and therefore may represent a plurality of pages of an input source document 110, and/or a plurality of sections (i.e., vertical sections) of individual pages, that have been designated by the partitioning module 120. Moreover, the group of sections 200(1)-(N) may represent all of the pages of a source document 110, or, alternatively, a subset of pages, such as a group of sections 200(1)-(N) of the source document 110 that have been grouped together by the clustering module 122 according to a similarity measure. For example, the sections 200(1)-(N) may represent sections that have been grouped based on the sections all having the same number of columns (e.g., two columns), perhaps with the same or similar columnar dimensions (e.g., column width: w1, w2), as determined by the partitioning module 120.

Estimation of the number of columns in the sections 200(1)-(N) may be accomplished in any suitable manner by the partitioning module 120, such as by determining breaks (e.g., white space) along a page width of the sections 200(1)-(N). The breaks may be known (i.e., predetermined), identified as vertical white spaces (or gaps) within the sections 200(1)-(N), or determined based on cues (known shapes, etc.) in the source document 110.

In some embodiments, the columnar dimensions may be determined based on a predefined page size of the pages in the source document 110. For example, the page size of the source document 110 may be predefined as A4 (ISO 216) with standardized dimensions (page width and page length dimensions) so that the column widths w1 and w2, for example, may be determined or at least roughly estimated. The determined number of columns and their associated dimensions may enable clustering of sections, such as the sections 200(1)-(N), in the source document 110 and generation of a frame 202 for layout detection purposes, shown in FIG. 2B and discussed further below.

FIG. 2A further shows that section 200(1) includes content (e.g., two columns of main content flow text, a heading, and a page number) that may be received (e.g., by extraction) by the content extractor 118 after receipt of an input source document 110 at the document processing server 104. The other sections 200(2)-(N) may include content that is also extracted by the content extractor 118, and as mentioned above, the content may be laid out in a similar manner (e.g., according to a similarity measure such as an estimated number of columns). The identification and extraction of content may be performed by any suitable technique, as mentioned above, such as identifying embedded structure of a PDF document, OCR techniques, etc., and any text-based content found among the sections 200(1)-(N) may be grouped into words and lines by the content extractor 118.

FIG. 2B further illustrates that, upon the partitioning module 120 estimating a number of columns of a section, such as section 200(1) having an estimated two columns, the layout detection engine 116 may determine how to process the section 200(1) for layout detection. In some embodiments, layout detection may be performed "on-the-fly" as the input source document 110 is processed (i.e., the single-pass technique mentioned above). In this scenario, at the time that a given section, such as section 200(1) is processed, the layout detection engine 116 may have already detected one or more layouts 128 in the source document 110. Accordingly, the layout detection engine 116 may determine whether an existing detected layout 128 fits the content laid out on the section 200(1). Determining whether an existing detected layout 128 fits the content of the section 200(1) may be based on a distance measure. If an existing detected layout 128 fits the extracted content of the section 200(1), a frame 202 corresponding to the existing detected layout 128 may be obtained.

In other embodiments, when the layout detection engine 116 first processes the section 200(1), it may not be able to find a suitable layout from the detected layouts 128 known to the layout detection engine 116, or it may not detect layouts until all of the sections are clustered by a similarity measure. In this case, the layout detection engine 116 may create the frame 202 for the section 200(1) that is based on the estimated number of columns and columnar dimensions of the section 200(1). The size of the frame 202 may correspond to a page size of the input source document 110 that is the subject of the layout detection process. For example, the size of the frame 202 may be A4 (ISO-216) based on an A4 page size for the source document 110. The frame 202 may include a first column 204 and a second column 206, each having column widths, w1 and w2, respectively, that are the same or at least similar to the column widths, w1 and w2, shown in FIG. 2A. The frame 202 is shown in FIG. 2B as comprising regions for content, which are the first column 204 and the second column 206 in this example, and regions without content. In this example, the regions of the frame 202 without content are shown in black as a left margin 208, a gutter 210, and a right margin 212.

Figures 3A, 3B:
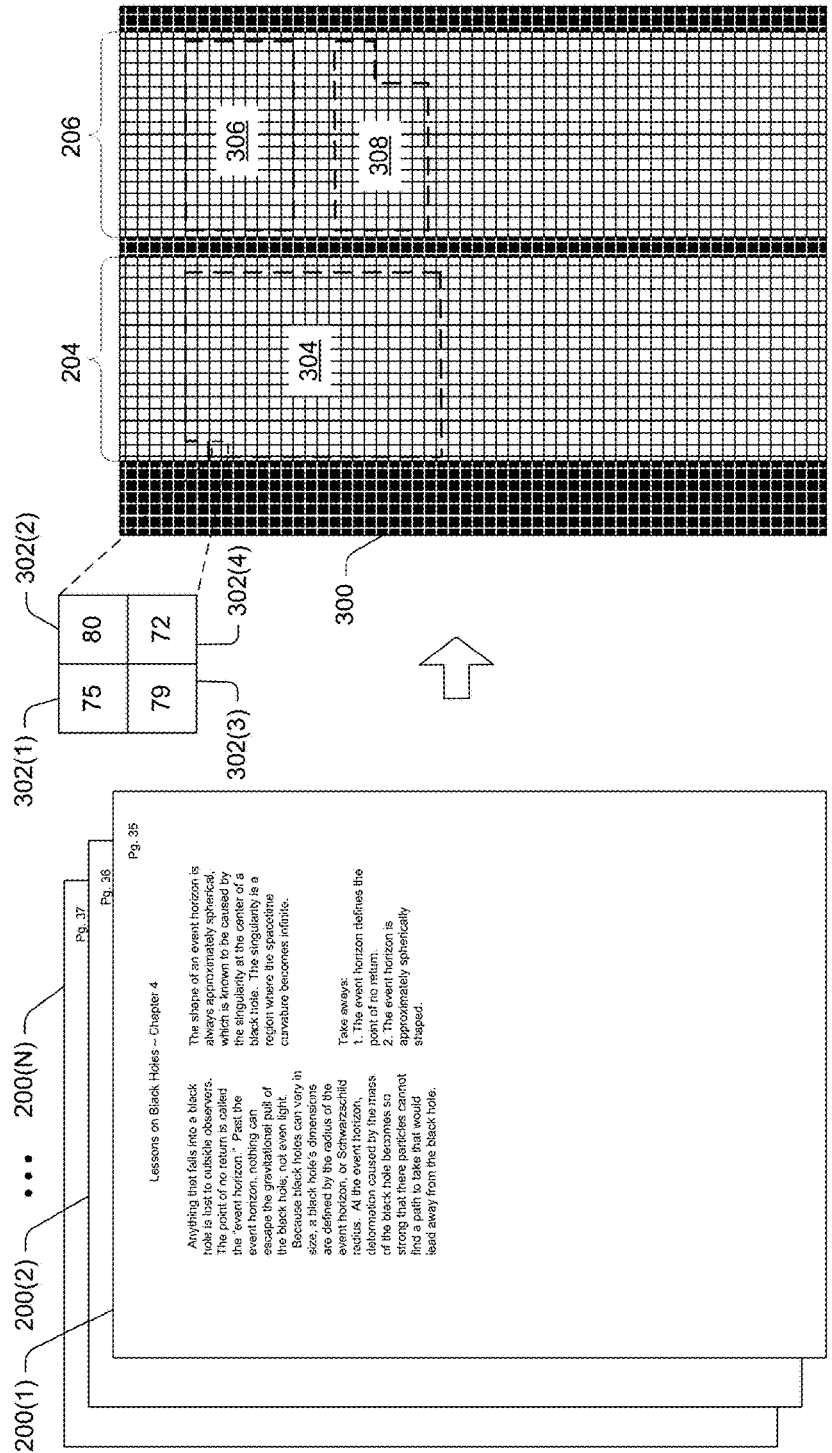
FIG. 3A illustrates the plurality of example sections of the input document of FIG. 2A.
FIG. 3B illustrates a two dimensional (2D) matrix that is created for the sections of FIG. 3A used to determine a location of the content within the sections.

Turning to FIGS. 3A and 3B, the sections 200(1)-(N) are again shown in FIG. 3A for reference to a 2D matrix 300 of FIG. 3B, the 2D matrix 300 being created for the sections 200(1)-(N) for use in layout detection of the input source document 110. The content location module 124 may create the 2D matrix 300 comprising a plurality of cells by dividing individual sections into discrete portions to form a grid, and the 2D matrix 300 could have any number of cells. A close up view of four example cells 302(1), 302(2), 302(3), and 302(4) are shown for illustrative purposes, and cells shown in FIG. 3B will be referred to herein as "the cells 302." The 2D matrix 300 may span a page size of the pages in the source document 110, and comprise any suitable resolution of the cells 302. For example, a high resolution 2D matrix 300 with a higher number of cells 302 (i.e., higher density) having a smaller size may be created, or a low resolution 2D matrix 300 with fewer cells 302 (i.e., lower density) having a larger size may be created. A person having ordinary skill in the art will recognize that, in theory, a higher resolution matrix may improve the accuracy of content boundary detection than a lower resolution matrix. However, a higher resolution 2D matrix 300 may significantly increase the computational cost (e.g., computational time and resources) needed for layout detection. Moreover, higher resolution matrices may introduce "noise" to the system in instances where smaller cells 302 detect outlier content that is not part of the core layout. Therefore, a suitable resolution for the 2D matrix 300 may be selected based on system resources, desired operating speed, efficiency, and/or accuracy. Each cell may be assigned an address to uniquely identify the relative position of each cell, and each may be associated with a 2D coordinate area (e.g., X and Y coordinate area) of a display onto which the pages/sections of the source document 110 are to be presented. In some embodiments, a pixel or dot, or group of pixels/dots, of the source document 110 page may be used to determine the density of the cells 302 in the 2D matrix 300. For example, a standard PDF converted to an image file format (e.g., JPEG, bitmap, etc.) at a certain resolution (e.g., 72 DPI) may be used as a guide for the cell density. With a document resolution of 72 DPI, for example, the cell density may be on the order of 72 cells per inch. In some embodiments, the 2D matrix 300 may have a cell density in the range between 72 DPI and 300 DPI.

As the content location module 124 processes each of the sections 200(1)-(N), the 2D matrix 300 may be utilized to locate the extracted content within each cell 302 of the 2D matrix 300. FIG. 3B shows dashed boundaries 304, 306, and 308 around those cells 302 that contain extracted content of the section 200(1), as an illustrative example. This determination is made by an incrementing process performed for individual ones of the cells 302. That is, for each cell 302 that contains extracted content within its boundary on a given section, such as the section 200(1), a counter may be incremented, such by integer increments, when content is contained therein. In other words, the content location module 124 may identify a first set of 2D coordinate areas associated with the cells that contain at least some of the extracted content from a first section 200(1), and may identify a second set of 2D coordinate areas associated with the cells that contain at least some of the extracted content from a second section 200(2), and so on. Each time content is found within a cell, the content location module 124 may add/increment a value to a sum of a number of times that content is contained within those cells for each section processed. This may be done for each section until at least a minimum number of the plurality of sections 200(1)-(N) have been processed and respective cells 302 incremented, resulting in a final value at each counter of each cell 302 to indicate the number of sections 200(1)-(N) that include extracted content within the respective cell 302. For example, the cells 302(1)-(4) are shown as having example counter values that indicate the number of sections 200(1)-(N) that content was contained within the cells 302(1)-(4) after all of the sections 200(1)-(N) were processed. After carrying out this incrementing technique, the content location module 124 obtains an idea of the dominant layout, or content boundary, with respect to a page of the source document 110 for a given set of sections 200(1)-(N). In FIG. 3B, the "white" cells 302 of the 2D matrix 300 represent those cells 302 that contain some content among the plurality of sections 200(1)-(N), while the "black" cells 302 represent those cells 302 that do not contain content for purposes of layout detection.

In some embodiments, the content location module 124 may be further configured to compare the final value of each individual cell to a threshold after the cells within the 2D matrix 300 have been incremented. Comparing against this thresholding may enable a dominant layout to be determined by removing outlier cells 302 from consideration in determining the boundary of main flow content to be designated as the layout. Any suitable thresholding may be used, as discussed above.

After the incrementing and thresholding of the 2D matrix 300 is performed for the sections 200(1)-(N), a resulting detected layout may be stored among a set of detected layouts 128 and used by the labeler 126 to map the detected layout to individual sections of the input source document 110.

Figure 4:
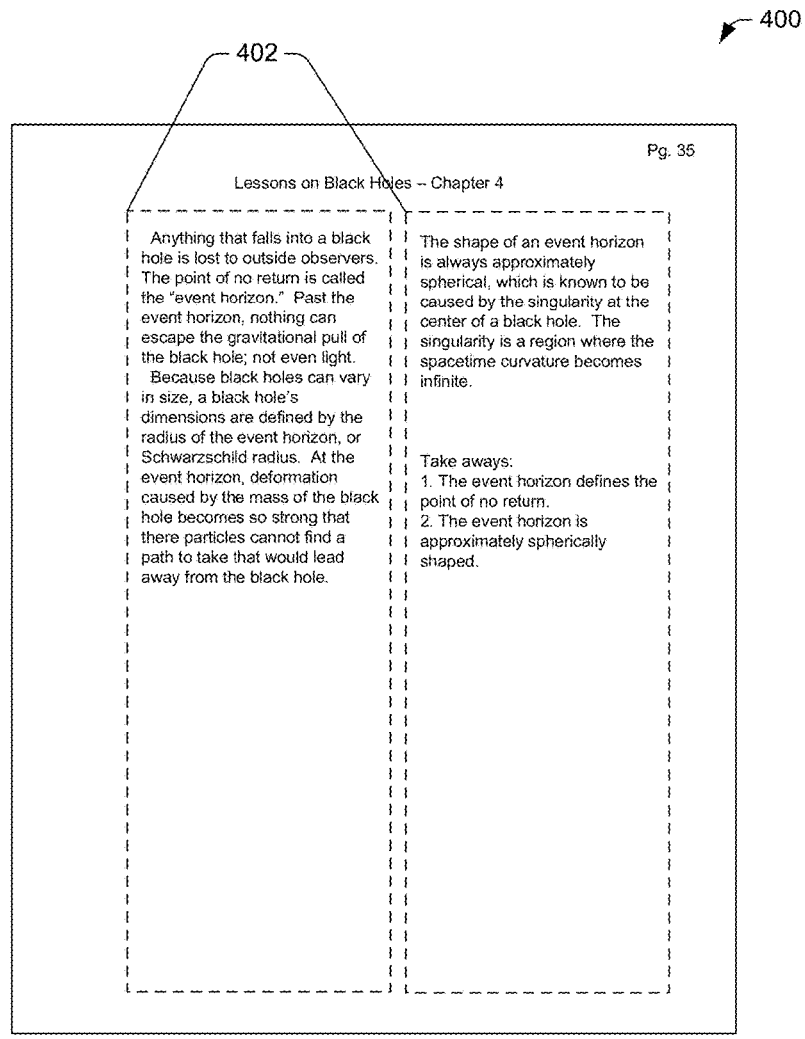
FIG. 4 illustrates an example page of an input document showing the page after the designated section of the page has been labeled with a detected layout.

FIG. 4 illustrates an example page 400 of the input source document 110 showing the page 400 after the designated section of the page has been labeled with a detected layout 402. In the example of FIG. 4, the detected layout 402 is a result from the processing of the sections 200(1)-(N) discussed with reference to FIGS. 2A-3B, and is defined by content bounds (shown by dashed lines of the layout 402) around the main content flow (i.e., the main body text of the page). All of the pages within the source document 110 may be labeled (i.e., the section(s) on the pages labeled) in this manner with individual ones of the detected layouts 128 that best fit the sections on those pages. That is, when other layouts are detected, other pages of the source document 110 may be labeled with the other detected layouts 128. The group of detected layouts 128 for a single source document 110 may be referred to as the layout of the source document 110 even though the layout of the source document 110 may comprise multiple detected layouts 128 for different pages of the source document 110. A source document 110 that has been labeled in such a manner may be formatted into a data file representing the processed document 130 that may be stored and/or transmitted for downstream processing and applications.

FIG. 5A illustrates a plurality of example pages 500(1), 500(2), . . . , 500(P) of an example input source document 110 that may be processed by the layout detection engine 116 to determine a layout within the source document 110. The pages 500(1)-(P) may be from the same input source document 110 discussed with reference to FIGS. 2A-4, or, alternatively, the pages 500(1)-(P) may represent a different source document 110 altogether. The example page 500(1) of FIG. 5A illustrates a relatively complex layout compared to the previous example layout referenced in FIGS. 2A-4 in terms of the arrangement of content (i.e., spatial locations and relationships between the content) on the page.

The page 500(1) is an example of a page that may be designated as having multiple sections, including a section 502(1) at the top of the page 500(1) and a section 502(2) below the section 502(1). The sections 502(1) and 502(2) may be determined by the partitioning module 120, as described above. That is, the partitioning module 120 may be configured to designate sections in the source document 110 along a lengthwise direction (i.e., along the page length direction shown in FIG. 2A) of the source document 110. While the page 500(1) may be suitable for division into two vertical sections, any given page may be suited for division into more than two sections, or may not be suitable for division into sections at all (i.e., the page comprises a single section) along the length of the page. The designation of sections by the partitioning module 120 may be accomplished by using heuristics or other cues that may denote a section break. As noted above, line spacing may be analyzed on the page 500(1) to identify a predominant line spacing distance. The partitioning module 120 may identify breaks (e.g., white space) along a vertical direction of the page 500(1) that may enable designating the sections 502(1) and 502(2). Still other cues such as font characteristics (e.g., bold, italics, etc.) may indicate section breaks and be used heuristically to determine section breaks.

In some embodiments, the clustering module 122 may group (or assign to groups) the section 502(1) with other similar sections according to a similarity measure (e.g., an estimated number of columns and columnar dimensions), while the clustering module 122 may group (or assign to groups) the section 502(2) with other similar sections according to the similarity measure. In other words, section 502(1) may be designated in a different group than the section 502(2) based on the similarity measure. For example, the partitioning module 120 may estimate that the section 502(1) contains extracted content (in this case, an image) in a single column spanning the page width, while the partitioning module 120 may estimate that the section 502(2) contains extracted content (in this case, text and images) in three columns having column widths of w4, w5, and w6).

The page 500(1) is also an example of a page having a section 502(2) that includes main flow content in the two rightmost columns, and a side note area in the leftmost column where main content text does not appear. Rather, the side note area in the leftmost column of the section 502(2) contains bubbles of text. When a number of sections that are grouped together with the section 502(2) are processed for layout detection, the layout detection engine 116 is able to distinguish the main content flow from what it deems as exceptions. In the example of section 502(2), the exception is the side note area in the leftmost column, and the layout to be detected is the main content flow in the two rightmost columns.

FIG. 5B illustrates a frame 504 that may be used for detecting layout in the section 502(2) of the page 500(1). As noted above, the frame 504 may be obtained from an associated existing detected layout 128 that is determined to fit the content of section 502(2), such as when the source document 110 is processed for layout detection in a single-pass where layouts are detected on-the-fly. The frame 504 may also be created based on the estimated number of columns and columnar dimensions, such as when no suitable detected layouts 128 are found, or when an iterative layout detection process is utilized for each layout in the source document 110. In either case, the size of the frame 504 may correspond to a page size of the input source document 110 and may include content columns including a first column 506, a second column 508, and a third column 510, each having column widths, w4, w5, and w6, respectively, that are the same or at least similar to the column widths, w4, w5, and w6, shown in FIG. 5A.

FIG. 6A shows the section 502(2) as represented on a page size of the input source document 110 for reference to a 2D matrix 600 of FIG. 6B that is created for a group of sections including the section 502(2). It is noted that a separate 2D matrix may be created for the section 502(1) of FIG. 5A because the section 502(1) may be grouped into a different group than the section 502(2) by the clustering module 122. The 2D matrix 600 may span a page size of the pages in the source document 110, and may comprise any suitable resolution of cells, as described above.

Upon processing the section 502(2), the content location module 124 may utilize the 2D matrix 600 to locate the extracted content within each cell. FIG. 6B shows dashed boundaries 602, 604, 606, and 608 around those cells of the 2D matrix 600 that contain extracted content of the section 502(2). This determination is made by the incrementing process discussed above. As a plurality of sections in a group including the section 502(2) are processed with the 2D matrix 600, 2D coordinate areas associated with cells that contain at least some extracted content may be identified, and, in response, a count may be incremented for each cell and added to a sum of previous sections for which content was identified within those individual cells. This may be done for each section where extracted content is contained within the cell to obtain a final value for each cell. After this process, individual ones of the cells of the 2D matrix 600 will have a final value to indicate the number of sections of the group of sections that include extracted content within the respective cell. In the example of FIG. 6B, assuming that the main flow content is contained within the two rightmost columns 508 and 510 across the group of sections, the incrementing process may reveal that extracted content predominantly appears in the two rightmost columns 508 and 510, and that the content appears less frequently among the sections in the leftmost column 506, so as to catch the side note area exception during the layout detection process. After the incrementing is performed in the 2D matrix 600, the content location module 124 obtains an idea of the dominant layout, or content boundary, with respect to a page of the source document 110 for a given set of sections, and in this case, a group of sections that includes the section 502(2).

The section 502(2) contains at least two different content types: text and image content. As mentioned above, different types of content may be associated with different weights according to the content type's influence on layout. For example, the cell counters may increment respective cells by a default value of 1 for each section in the group where content is contained within the respective cells. However, if it is determined, for a given section, such as the section 502(2), that the content within a particular cell is text-based content, where text-based content is associated with a weight of 3, the incremented value for the particular cell having text-based content therein may be an incremented value of 3 (i.e., the default value of 1 multiplied by the weight of 3). Whereas, a cell containing image content, such as the cells in the lower right corner of the 2D matrix 600 may be incremented by the base value of 1 when it contains the image content for a given section, such as the section 502(2). This technique may establish a dominant content type, such as text-based content, that may perhaps be more indicative of layout for certain types of source documents 110. In some embodiments, weights for different content types may be established according to a category of the source document 110, such as textbooks, cookbooks, research papers, etc.

In some embodiments, the content location module 124 may be further configured to compare the number of times that each cell would contain at least some of the content from the pages when they are presented on a display to a threshold after the cells within the 2D matrix 600 have been incremented. After the incrementing and thresholding of the 2D matrix 600 is performed for a set of sections including the section 502(2), a resulting detected layout may be stored among a set of detected layouts 128 and used by the labeler 126 to map the detected layout to individual sections of the input source document 110.

Figure 5:
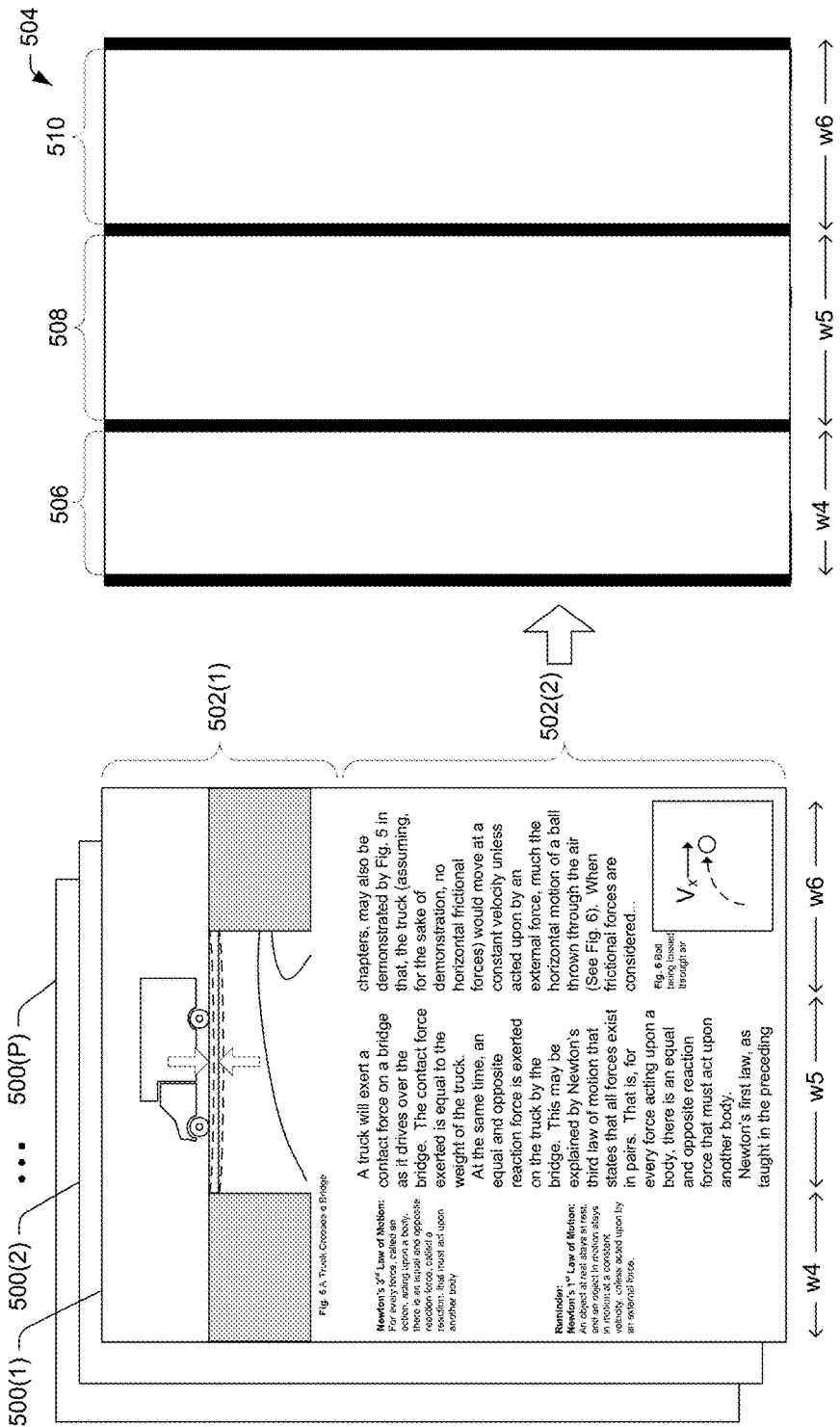
FIG. 5A illustrates a plurality of example pages of an example input document that may be processed by a layout detection engine to determine a layout among sections in the pages.
FIG. 5B illustrates an example frame that may be used for layout detection of a section.
Figure 6:
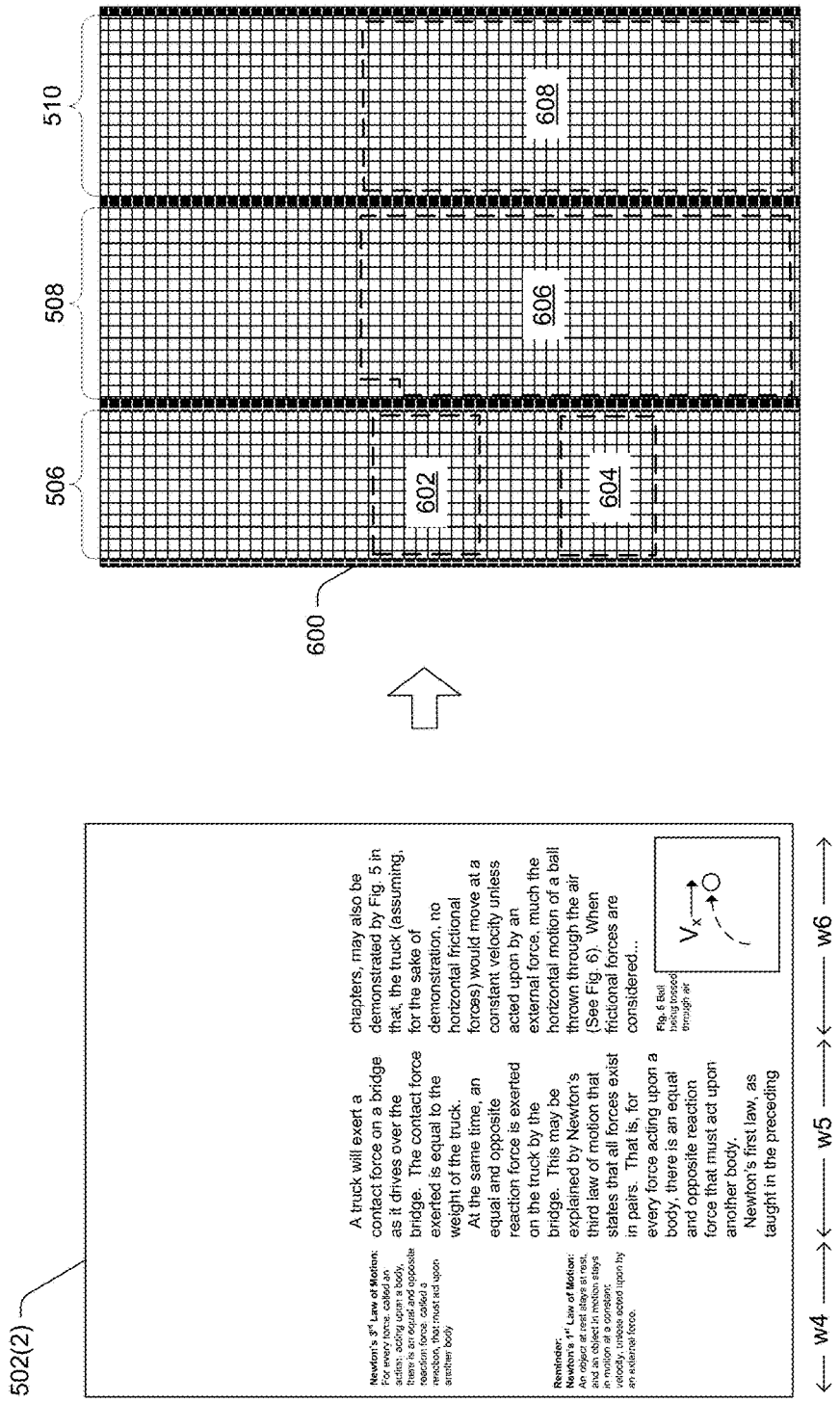
FIG. 6A illustrates an example section from a page shown in FIG. 5A.
FIG. 6B illustrates an example 2D matrix created for a group of sections including the section of FIG. 6A.
Figure 7:
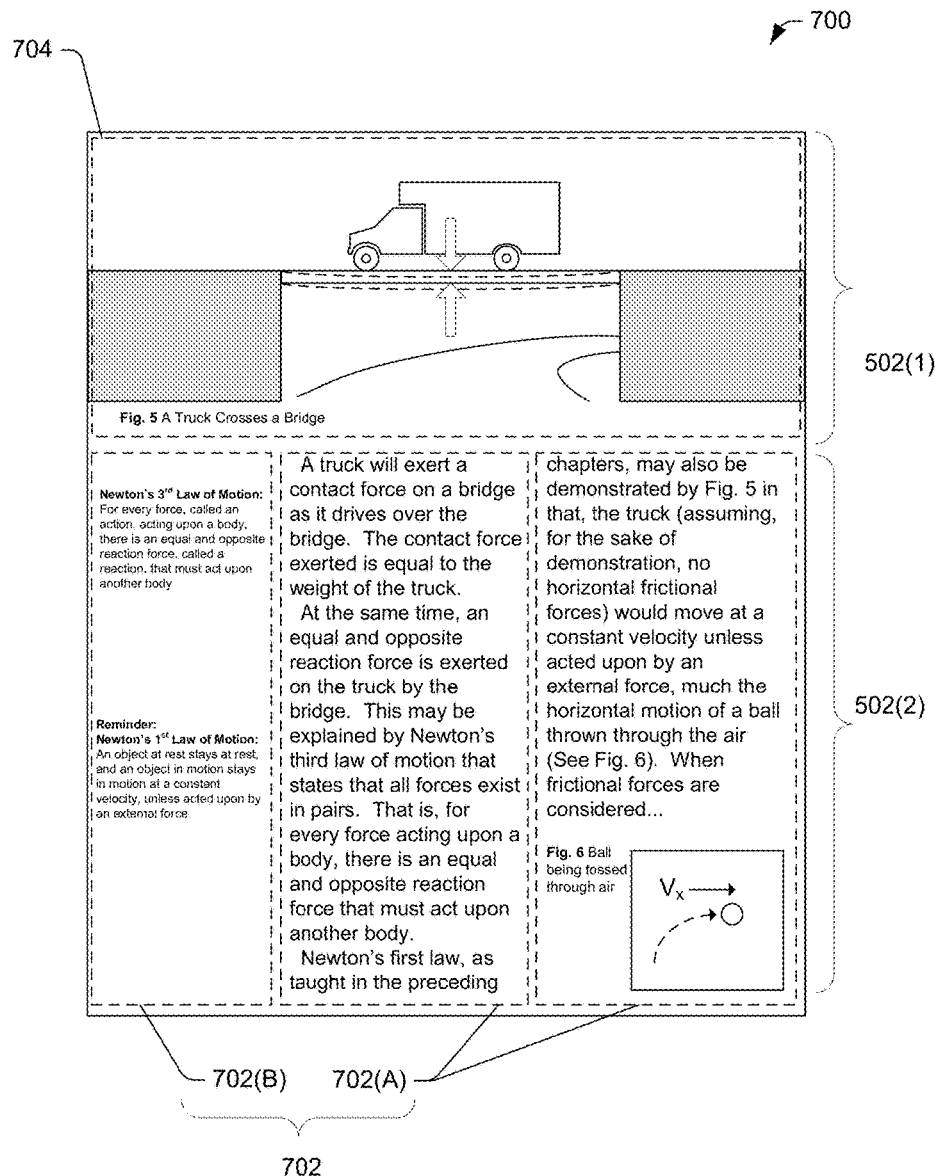
FIG. 7 illustrates an example page of an input document showing the page after the designated sections of the page have been labeled with a detected layout.

FIG. 7 illustrates an example page 700 of the input source document 110 representative of the page 500(1) of FIG. 5A after the designated sections (502(1) and 502(2)) of the page 500(1) have been labeled with a detected layout 702 and a detected layout 704. That is, the detected layout 702 results from the layout detection process relating to the section 502(2), which was described with reference to FIGS. 5A-6B. However, by processing the section 502(1) with another 2D matrix corresponding to a group of sections including the section 502(1), the detected layout 704 may be derived in a similar fashion.

In the example of FIG. 7, the detected layout 702 includes the main content flow layout 702(A) and the exception area 702(B), both being defined by content bounds (shown by dashed lines of the layout 702). The exception area 702(B) may be captured as a supplementary segment of the layout 702, the exception area 702(B) in this example being an open column that may contain content or it may remain open with no content. The main content flow layout 702(A), however, represents the segment of the layout 702 where the main content flow appears. This distinction is determined based on the incrementing process using the 2D matrix 600 to determine where the content predominantly appears so that main flow content may be identified. With the detected layouts 702 and 704, pages of the source document 110 having content fitting the layouts 702 and 704 may be labeled (i.e., the section(s) on the pages may be labeled) in this manner. A source document 110, having been labeled with the detected layouts 702 and 704, and perhaps other layouts, such as the layout 402 shown in FIG. 4 on appropriate pages, may be formatted into a data file representing the processed document 130 that may be stored and/or transmitted for downstream processing and applications.

FIG. 8A illustrates a plurality of example pages 800(1), 800(2), . . . , 800(M) of an example input source document 110 that may be processed by the layout detection engine 116 to determine a layout within the source document 110. The example page 800(1) of FIG. 8A illustrates another relatively complex layout compared to the example layout referenced in FIGS. 2A-4.

The page 800(1) is an example of a page that may be designated as having multiple sections, including a section 802(1) at the top of the page 800(1) and a section 802(2) below the section 802(1). The sections 802(1) and 802(2) may be determined by the partitioning module 120, as described above, and the clustering module 122 may group the section 802(1) with other similar sections according to a similarity measure (e.g., an estimated number of columns and columnar dimensions), while the clustering module 122 may group the section 802(2) with other similar sections according to the similarity measure. In other words, section 802(1) may be designated in a different group than the section 802(2) based on the similarity measure. For example, the partitioning module 120 may estimate that the section 802(1) contains extracted content (e.g., main content text and a header including images) in two columns having associated columnar dimensions, while the partitioning module 120 may estimate that the section 802(2) contains extracted content (in this case, main content text and headers) in two columns having column widths of w7 and w8.

The page 800(1) is also another example of a page having a section 802(2) that includes main flow content in the rightmost column, and an open column as the leftmost column where main content text does not appear. When a number of sections that are grouped together with the section 802(2) are processed for layout detection, the layout detection engine 116 is able to distinguish the main content flow from what it deems as exceptions, in this example, the exception is the open column in the section 802(2).

FIG. 8B illustrates a frame 804 that may be used for detecting layout in the section 802(2) of the page 800(1). As noted above, the frame 804 may be obtained from an associated existing detected layout 128 that is determined to fit the content of section 802(2), such as when the source document 110 is processed for layout detection in a single-pass through the source document 110 where layouts are detected on-the-fly. The frame 804 may also be created based on the estimated number of columns and columnar dimensions, such as when no suitable detected layouts 128 are found, or when an iterative layout detection process is utilized for each layout in the source document 110. In either case, the frame 804 may include content columns including a first column 806 and a second column 808, each having column widths, w7 and w8, respectively, that are the same or at least similar to the column widths, w7 and w8, shown in FIG. 8A.

FIG. 9A shows the section 802(2) as represented on a page size of the input source document 110 for reference to a 2D matrix 900 of FIG. 9B that is created for a group of sections including the section 802(2). It is noted that a separate 2D matrix may be created for the section 802(1) of FIG. 8A because the section 802(1) may be grouped into a different group than the section 802(2) by the clustering module 122. The 2D matrix 900 may span a page size of the pages in the source document 110, and may comprise any suitable resolution of cells, as described above.

Upon processing the section 802(2), the content location module 124 may utilize the 2D matrix 900 to locate the extracted content within each cell. FIG. 9B shows a dashed boundary 902 around those cells of the 2D matrix 900 that contain extracted content of the section 802(2). This determination is made by the incrementing process discussed above. As a plurality of sections in a group including the section 802(2) are processed with the 2D matrix 900, a counter for each cell of the 2D matrix 900 may be incremented for each section where extracted content is contained within the cell. After this process, individual ones of the cells of the 2D matrix 900 will have a final value to indicate the number of sections of the group of sections that include extracted content within the respective cell. In the example of FIG. 9B, assuming that the main flow content is contained within the rightmost column 808 across the group of sections, the incrementing process may reveal that extracted content predominantly appears in the rightmost column 808, and that the content appears less frequently, or not at all, among the sections in the leftmost column 806, so as to catch the open column area exception during the layout detection process. After the incrementing is performed in the 2D matrix 900, the content location module 124 obtains an idea of the dominant layout, or content boundary, with respect to a page of the source document 110 for a given set of sections, and in this case, a group of sections that includes the section 802(2).

In some embodiments, the content location module 124 may be further configured to compare final value for each cell to a threshold after the cells within the 2D matrix 900 have been incremented. After the incrementing and thresholding of the 2D matrix 900 is performed for a set of sections including the section 802(2), a resulting detected layout may be stored among a set of detected layouts 128 and used by the labeler 126 to map the detected layout to individual sections of the input source document 110.

Figure 8:
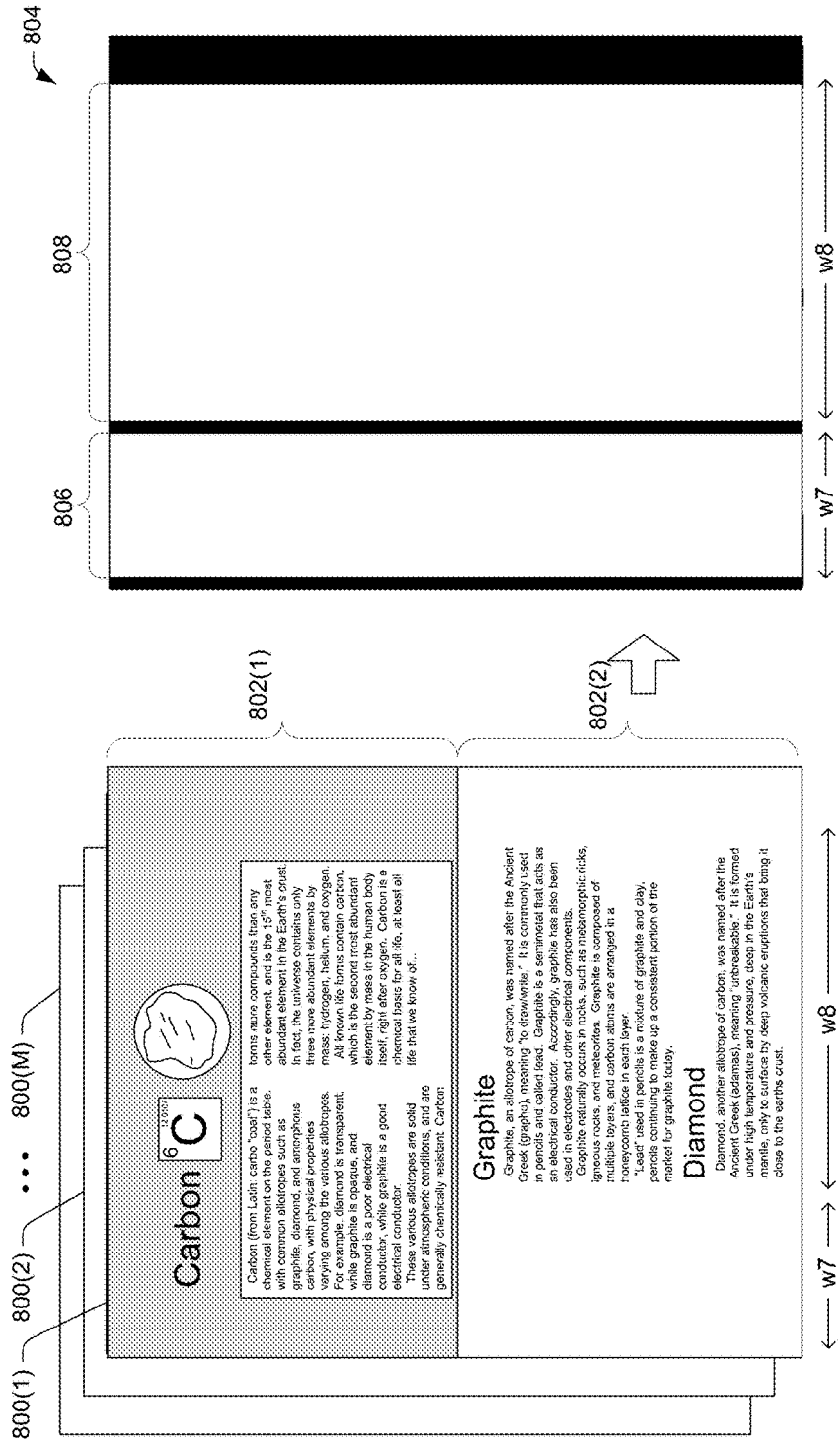
FIG. 8A illustrates a plurality of example pages of an example input document that may be processed by a layout detection engine to determine a layout among sections in the pages.
FIG. 8B illustrates an example frame that may be used for layout detection of a section.
Figure 9:
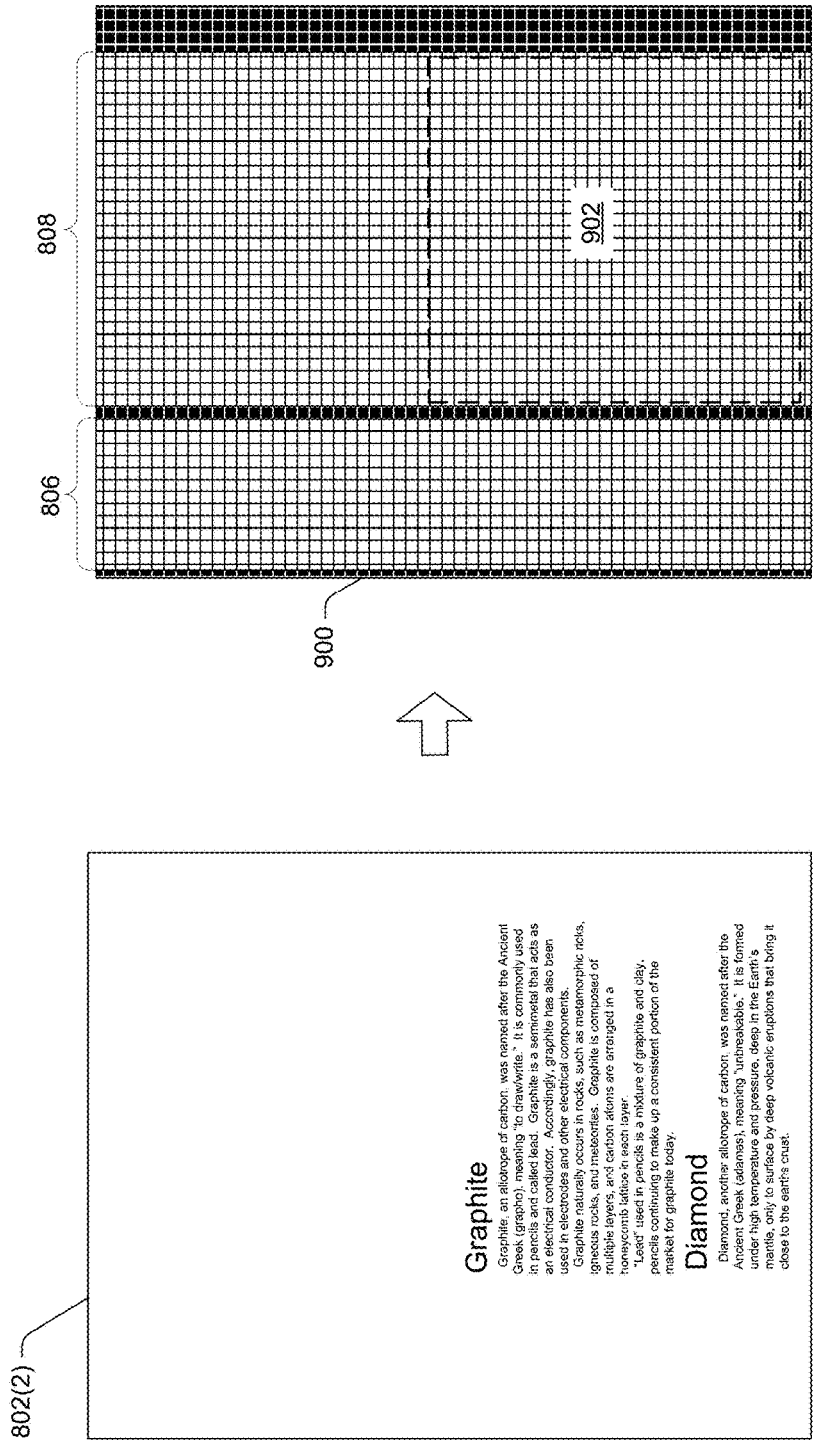
FIG. 9A illustrates an example section from a page shown in FIG. 8A.
FIG. 9B illustrates an example 2D matrix created for a group of sections including the section of FIG. 9A.
Figure 10:
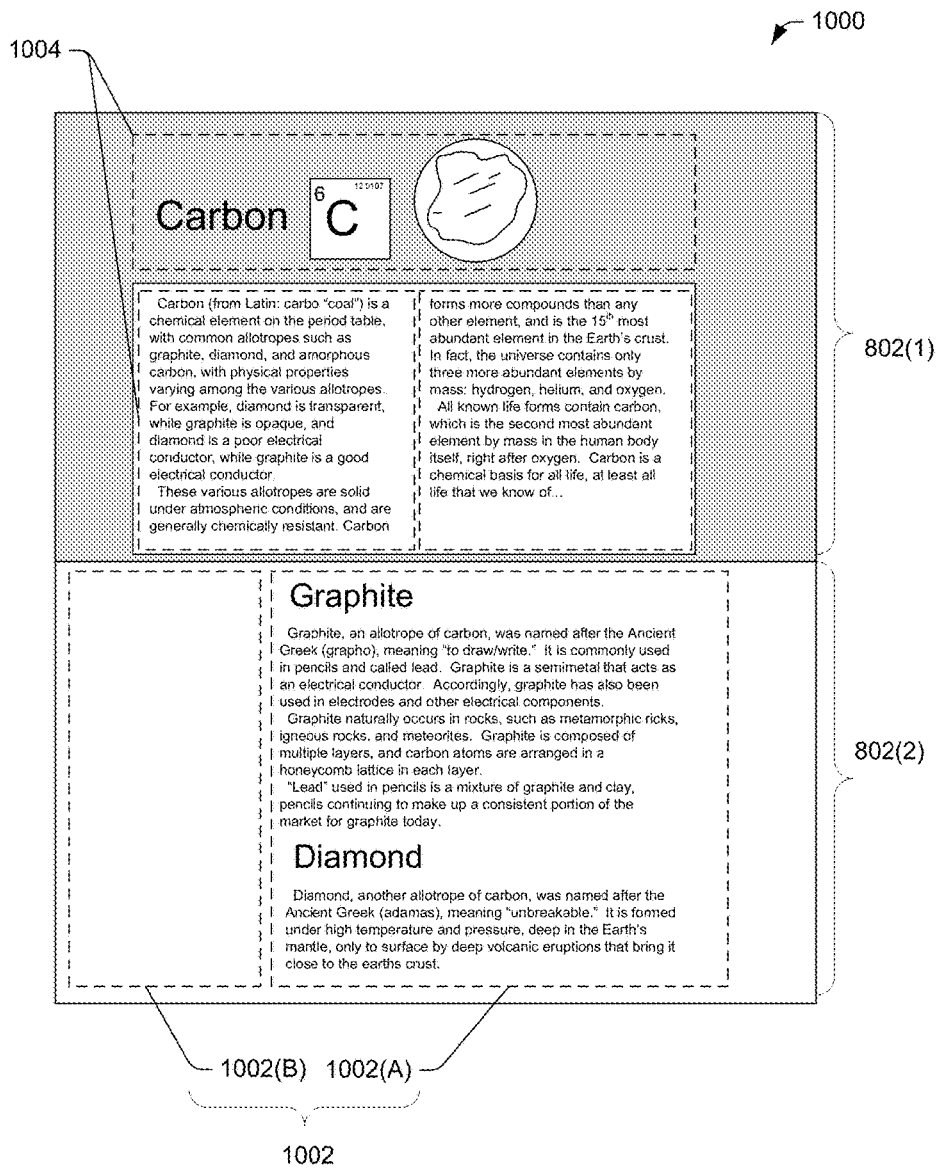
FIG. 10 illustrates an example page of an input document showing the page after the designated sections of the page have been labeled with a detected layout

FIG. 10 illustrates an example page 1000 of the input source document 110 representative of the page 800(1) of FIG. 8A after the designated sections (802(1) and 802(2)) of the page 800(1) have been labeled with a detected layout 1002 and a detected layout 1004. That is, the detected layout 1002 results from the layout detection process relating to the section 802(2), which was described with reference to FIGS. 8A-9B. However, by processing the section 802(1) with another 2D matrix corresponding to a group of sections including the section 802(1), the detected layout 1004 may be derived in a similar fashion.

In the example of FIG. 10, the detected layout 1002 includes the main content flow layout 1002(A) and the exception area 1002(B), both being defined by content bounds (shown by dashed lines of the layout 1002). The exception area 1002(B) may be captured as a supplementary segment of the layout 1002, the exception area 1002(B) in this example being an open column that may contain content or it may remain open with no content. The main content flow layout 1002(A), however, represents the segment of the layout 1002 where the main content flow appears. This distinction is determined based on the incrementing process using the 2D matrix 900 to determine where the content predominantly appears so that main flow content may be identified. With the detected layouts 1002 and 1004, pages of the source document 110 having content fitting the layouts 1002 and 1004 may be labeled (i.e., the section(s) on the pages may be labeled) in this manner. A source document 110, having been labeled with the detected layouts 1002 and 1004, and perhaps other layouts, such as the layouts 402, 702, and/or 704 shown in FIGS. 4 and 7 on appropriate pages, may be formatted into a data file representing the processed document 130 that may be stored and/or transmitted for downstream processing and applications.

Illustrative Process

Figure 11:
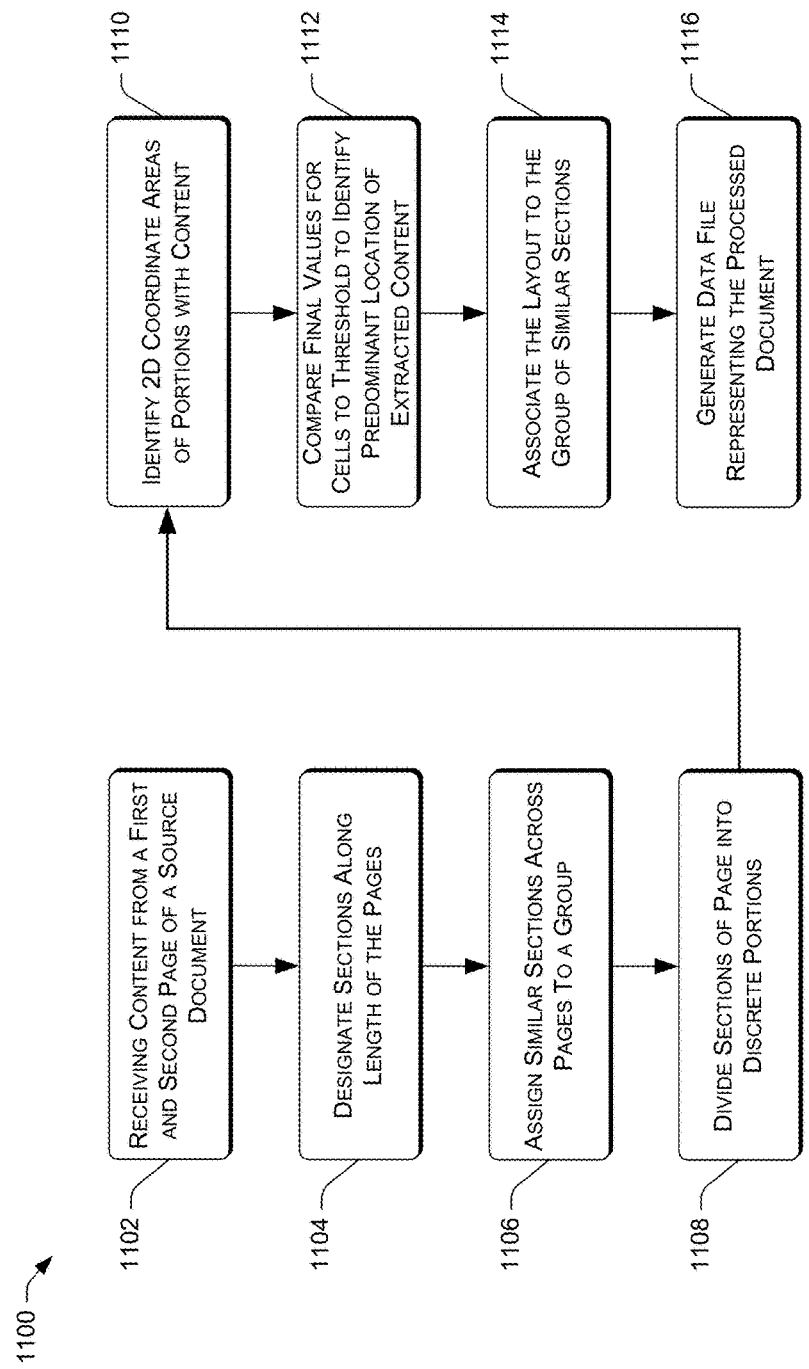
FIG. 11 is a flow diagram of an illustrative process of detecting a layout of an electronic document.

FIG. 11 is a flow diagram of an illustrative process 1100 of detecting layout of an electronic source document 110. The process is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

The process 1100 may be performed by the layout detection engine 116 including any one or combination of the modules of the layout detection engine 116. At 1102, the content extractor 118 may receive an input source document 110 and receive (e.g., extract) content from the source document 110. In some scenarios, the source document 110 may include a plurality (e.g., hundreds) of pages, in which case the content extractor 118 may traverse the source document 110 page-by-page to extract the content. As an illustrative example, the receipt at 1102 may include extracting content such as text and image content from an input PDF source document 110 having an embedded structure of identifiable content.

At 1104, the partitioning module 120 may designate sections in the electronic source document 110 along a lengthwise direction of the document's pages. For example, the partitioning module 120 may designate sections in the source document 110 at any suitable dividing point, such as predefined page breaks of the source document 110, and/or section breaks that may be identified by detecting breaks (e.g., white space) along the length of the page, analyzing line spacing and/or font characteristics on a page of the source document 110, and the like. Any suitable heuristic may be utilized to find break points to designate multiple sections in the source document 110.

At 1106, the clustering module 122 may associate or cluster the sections of the source document 110 into one or more groups based on a similarity measure between the sections. In some embodiments, a suitable similarity measure may comprise a number of columns detected in the sections and the columnar dimensions (e.g., column width and/or column length) of the detected columns. That is, sections may be grouped by the number of columns and the columnar dimensions so that the sections of any group have the same number of columns and the same or similar dimensions. The partitioning module 120 may facilitate the estimation of columns by detecting breaks along the width of a section or another suitable means of estimating columns of the section.

At 1108, the content location module 124 may divide the pages, including the sections designated therein, into discrete portions to create a 2D matrix or grid, such as the 2D matrices 300, 600, 900 comprising multiple cells (i.e., the discrete portions) spanning a page size of the source document 110. Particular 2D matrices may be associated with particular groups of sections so that there may be a one-to-one correspondence between a 2D matrix and a group of sections having one of many potential layouts within the source document 110. The cells of the 2D matrix may be created by the dividing at 1108 and may be of any suitable size and density to provide a 2D matrix of any suitable resolution. Furthermore, the discrete portions (cells) may be assigned addresses in terms of relative 2D (X and Y) coordinates that uniquely identify each cell for purposes of identifying content within each cell, and each cell may be associated with a 2D coordinate area (e.g., a rectangular area). In this sense, the 2D matrix may serve as a map over the span of the page size to determine location of extracted content on a section within the source document 110.

At 1110, for a 2D matrix created at 1108, sets of 2D coordinate areas corresponding to respective cells that contain extracted content may be identified for each section that is processed, and, in response, the content location module 124 may determine a number of times that each discrete portion would contain at least some of the extracted content from each processed section when the sections (or their associated pages) are presented on a display. For example, a counter associated with each cell may be incremented, for every section within a group of sections, when the cell includes extracted content therein. By incrementing counters of individual cells of the 2D matrix, the 2D matrix is transformed into a map spanning the page that has a plurality of values in each cell indicative of content occurrence within each cell across the set of sections.

At 1112, the final values of each cell may be individually compared to a threshold to determine a layout of the group of sections. That is, the thresholding at 1112 may result in a mask corresponding to the dominant content layout among the sections of the group. The cells of the 2D matrix having final values that meet or exceed the threshold (i.e., counter values meeting or exceeding the threshold) may be set to a common value or status (e.g., flagged in a binary manner such as being "on" or "off") to indicate inclusion for layout detection purposes, whereas the cells that are filtered out as having a final value below the threshold may be set to another common value or state to indicate exclusion for layout detection purposes.

Any suitable thresholding technique may be utilized at 1112, including fixed thresholding (e.g., thresholding the values of the cells at a fixed value), dynamic thresholding (e.g., threshold computed based on a median value of the cells after they have been incremented, threshold computed to keep a fixed percentage of cells, etc.), Otsu's algorithm (i.e., computing a threshold from a histogram to find the threshold that maximizes the cross-variance between the histogram above the threshold and that below the threshold), maximal mutual information thresholding (i.e., treat the histogram as a probability distribution to find the threshold that maximizes the mutual information between the histogram above the threshold and that below the threshold), and the like. In some embodiments, an initial thresholding performed at 1112 to keep a subset of cells of the 2D matrix may be refined by further processing the remaining cells (e.g., comparing to a second threshold).

The result after step 1112 according to the above described embodiments is a detected layout 128 of the input source document 110. In some embodiments, the dimensions of the cells of the 2D matrix may be used to convert the detected layout (i.e., the text to be included in the layout) into units of measurement that are suitable for typography purposes, such as conversion or adjustment of text in the layout into to pica/point typographic units of measurement. For example, when a cell resolution or density corresponds to 72 cells per inch (i.e., cells measuring approximately 0.014 inches across, the typographical size in terms of picas or points may be determined by converting the measurement of a text-based character in inches to picas or points, and associating the text-based character with the typographical size in terms of the picas/points unit of measurement. Such a conversion may facilitate smooth transition between layouts when adapting the detected layout 128 to a different layout associated with the viewing device 106.

At 1114, the labeler 126 may associate (e.g., map) the detected layout 128 with individual sections in the source document 110 so that the source document 110 can be labeled with the detected layout 128 on appropriate pages. The process 1100 may be iterated any number of times to detect other layouts, such as other layouts associated with other groups of sections determined from the assigning to groups at 1106. For instance, if a given source document 110 comprises N detectable layouts, the process 1100 may be iterated between 1108 and 1114 by taking N passes through the source document 110 to detect each of the N layouts in a similar manner, where all N layouts may then be associated with appropriate sections in the source document 110 at 1114.

In some embodiments, a single-pass technique may be implemented with the process 1100 that includes taking a single-pass through pages of an input source document 110 and associating each detectable layout in the source document 110 as the source document 110 is processed by the layout detection engine 116. Because detecting a layout using the process 1100 depends on the availability of data (i.e., a number of pages or sections that can be used with the 2D matrix to determine a dominant location among the pages/sections, a detectable layout in the source document 110 may not be detected until a certain number of sections (i.e., a minimum number of sections) are processed. After a minimum number of sections are processed with the steps of the process 1100, a first layout may be detected and stored as a detected layout 128. As the remaining sections/pages of the source document 110 are processed, any sections that are mapped to the first detected layout may be added to the data set for the first layout and labeled accordingly. The sections encountered that do not map to any previously detected layout 128 may be analyzed with the steps of the process 1100 for detecting another layout in parallel to labeling sections with the already-detected layouts 128.

When the sections within the source document 110 are identified and labeled with appropriate ones of the detected layouts 128, a data file may be generated at 1116, the data file representing the processed document 130. Any suitable data structure or file format may be used to generate the data file at 1116, and the data file may associate designated sections to the pages in the source document 110, as well as the detected layouts that are labeled on each page.

In some embodiments, the process 1100, or at least aspects of the process 1100, may be refined using machine learning techniques that learn from training data. For example, human operators may validate labeled pages of the processed document 130. A machine learning model may then be utilized with the validated data serving as training data to continuously update aspects of the process 1100, such as the thresholding parameters applied at 1112, criteria used for associating the layout to sections in the source document 110 at 1114, the resolution of the 2D matrix (i.e., cell density) that optimizes the layout detection, adjusting the similarity measure at 1106, and the like. Any suitable machine learning model may be used for purposes of refining the process 1100, such as an artificial neural network, a hidden Markov model (HMM), a Kalman filter (or enhanced Kalman filter), a Bayesian network (or Bayesian belief network), a support vector machine (SVM), a decision tree, or any suitable machine learning model that uses algorithms to effectively map input (e.g., source documents 110) to output (e.g., processed documents 130 with detected layouts 128). It is to be appreciated that the machine learning utilized herein may be based on supervised or unsupervised machine learning techniques.

As mentioned above, the layout(s) detected by the process 1100 may be used to adaptively render the processed documents 130 to different viewing devices 106 based on the constraints associated with the particular viewing device 106. For example, a display size constraint, or a user preference constraint (e.g., font size), may drive the utilization of the layout detected from the process 1100 to be mapped to a different layout suitable for the display size or user preferences associated with the particular viewing device.

In some embodiments, other useful applications may be performed with the detected layout, such as determining a salience of content objects on a page of the processed document 130. For instance, if an object (e.g., an image) is identified as spanning multiple columns of a multi-column detected layout, a salience may be determined according to the number of columns the objects spans across. This salience may be attached or otherwise associated with the content objects of the processed document 130 so that the design intent of the content creator may be propagated to the viewing device 106 upon rendering the processed document 130 thereon.

In other embodiments, the detected layout may be utilized for efficient editing of the processed document 130. For example, pages of the processed document 130 may be grouped by the layouts they are labeled with and edited together at the same time, saving time and resources for uniformly applicable editing based on the layout of the processed document 130. In yet other embodiments, the detected layout may be utilized for semantic analysis (e.g., labeling the extracted content with semantic tags such as main body, headings, inserts, headers, footers, side notes, end notes, etc.).

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    extracting content from a first page and a second page of a source document, the first page and the second page each having a fixed layout;
    determining a section break along a lengthwise direction of the first page;
    designating a first section of the first page and a second section of the first page based at least in part on the section break of the first page;
    determining a number of columns of the first section of the first page, including at least a first column and a second column;
    determining a column width of the first column of the first section of the first page and a column width of the second column of the first section of the first page;
    determining a section break along a lengthwise direction of the second page;
    designating a first section of the second page and a second section of the second page based at least in part on the section break of the second page;
    determining a number of columns of the first section of the second page, including at least a first column and a second column;
    determining a column width of the first column of the first section of the second page and a column width of the second column of the first section of the second page;
    determining whether the number of columns of the first section of the first page is a same as the number of columns of the first section of the second page;
    determining that a difference in width between the column width of the first column of the first section of the first page and the column width of the first column of the first section of the second page is less than or equal to a predetermined width difference;
    determining that a difference in width between the column width of the second column of the first section of the first page and the column width of the second column of the first section of the second page is less than or equal to the predetermined width difference;
    assigning the first section of the first page and the first section of the second page to a first group based at least in part on determining that: (i) the number of columns of the first section of the first page is the same as the number of columns of the first section of the second page; (ii) the difference in width between the column width of the first column of the first section of the first page and the column width of the first column of the first section of the second page is less than or equal to the predetermined width difference, and (iii) the difference in width between the column width of the second column of the first section of the first page and the column width of the second column of the first section of the second page is less than or equal to the predetermined width difference;
    dividing the first section of the first page into a first plurality of discrete portions to form a first grid having a defined density of discrete portions within a first area of the first section of the first page;
    dividing the first section of the second page into a second plurality of discrete portions to form a second grid having the defined density of discrete portions within a second area of the first section of the second page;
    identifying a first type of content and a second type of content within the extracted content, the first type of content being different than the second type of content;
    assigning a first weight to the first type of content and a second weight to the second type of content based at least in part on a category of the source document, the first weight being greater than the second weight based at least part on a determination that the first weight is more indicative of a layout of the source document; and
    determining, based at least partly on at least one of the first weight or the second weight, a layout of the first group based at least in part on a determination of whether or not individual discrete portions of the first grid and the second grid would contain at least some of the extracted content within the first section of the first page or within the first section of the second page when the first page and the second page are respectively presented on a display.

2. The method as recited in claim 1, further comprising:
    determining that a number of columns for the second section of the first page is one;
    determining that a number of columns for the second section of the second page is one;
    determining a column width of the one column of the second section of the first page;
    determining a column width of the one column of the second section of the second page;
    determining that the number of columns for the second section of the first page is the same as the number of columns for the second section of the second page;
    determining whether a difference in width between the column width of the one column of the second section of the first page and the column width of the one column of the second section of the second page is less than the predetermined width difference; and
    assigning the second section of the first page and the second section of the second page to a second, different group.

3. The method as recited in claim 1, wherein:
    the first plurality of discrete portions that form the first grid include at least first and second discrete portions, the first discrete portion associated with a first two-dimensional (2D) coordinate area of the display onto which the first and second pages are to be presented and the second discrete portion associated with a second 2D coordinate area of the display;
    the second plurality of discrete portions that form the second grid include at least third and fourth discrete portions, the third discrete portion associated with the first 2D coordinate area and the fourth discrete portion associated with the second 2D coordinate area; and
    the determining the layout of the first group further comprises:
        determining whether the first discrete portion would contain at least some of the extracted content from the first section of the first page when the first page is presented on the display;
        determining whether the third discrete portion would contain at least some of the extracted content from the first section of the second page when the second page is presented on the display;

determining whether the second discrete portion would contain at least some of the extracted content from the first section of the first page when the first page is presented on the display;

determining whether the fourth discrete portion would contain at least some of the extracted content from the first section of the second page when the second page is presented on the display;

determining a first sum of a number of times that the first discrete portion would contain at least some of the extracted content from the first page when the first page is presented on the display and a number of times that the third discrete portion would contain at least some of the extracted content from the second page when the second page is presented on the display;

determining a second sum of a number of times that the second discrete portion would contain at least some of the extracted content from the first page when the first page is presented on the display and a number of times that the fourth discrete portion would contain at least some of the extracted content from the second page when the second page is presented on the display;

comparing the first sum to a threshold;

comparing the second sum to the threshold;

in response to determining that the first sum meets or exceeds the threshold, designating the first 2D coordinate area as a part of the layout of the first group;

in response to determining that the second sum meets or exceeds the threshold, designating the second 2D coordinate area as another part of the layout; and mapping the layout to the first section of the first page and to the first section of the second page; and the method further comprising generating a data file that represents the source document in association with the layout.

4. The method as recited in claim 3, further comprising determining a typographical size of text to be included in the layout based on converting known dimensions of the first, second, third, and fourth discrete portions to a typographical unit of measurement including at least one of picas or points.

5. A method comprising:

receiving first content from a first page and second content from a second page of a source document;

designating a first section of the first page and a second section of the first page along a first direction of the first page;

designating a first section of the second page and a second section of the second page along a first direction of the second page;

assigning the first section of the first page and the first section of the second page to a first group;

for the first group:

determining a suitable resolution associated with the first page and the second page based at least in part on at least one of resources of a device on which the source document is to be displayed or an operating speed associated with the device;

dividing, based at least in part on the suitable resolution, the first section of the first page into a first plurality of discrete portions to form a first grid having a defined density of discrete portions within a first area of the first section of the first page, the first plurality of discrete portions that form the first grid including at least a first discrete portion and a second discrete portion, the first discrete portion associated with a first two-dimensional (2D) coordinate area of a display of the device and the second discrete portion associated with a second 2D coordinate area of the display;

dividing, based at least in part on the suitable resolution, the first section of the second page into a second plurality of discrete portions to form a second grid having the defined density of discrete portions within a second area of the first section of the second page, the second plurality of discrete portions that form the second grid including at least a third discrete portion and a fourth discrete portion, the third discrete portion associated with the first 2D coordinate area and the fourth discrete portion associated with the second 2D coordinate area;

determining the first discrete portion contains at least some of the first content;

determining the third discrete portion contains at least some of the second content;

determining the second discrete portion contains at least some of the first content;

determining the fourth discrete portion contains at least some of the second content;

designating the first 2D coordinate area as part of a layout of the first group; and designating the second 2D coordinate area as part of the layout of the first group; and associating the layout of the first group with the first section of the first page and with the first section of the second page.

6. The method as recited in claim 5, further comprising:

assigning the second section of the first page and the second section of the second page to a second group;

for the second group:

determining a fifth discrete portion of the second section of the first page and a sixth discrete portion of the second section of the first page, the fifth discrete portion associated with a third two-dimensional (2D) coordinate area of the display and the sixth discrete portion associated with a fourth 2D coordinate area of the display;

determining a seventh discrete portion of the second section of the second page and an eighth discrete portion of the second section of the second page;

determining the fifth discrete portion contains at least some of the first content;

determining the seventh discrete portion contains at least some of the second content;

determining the sixth discrete portion contains at least some of the first content;

determining the eighth discrete portion contains at least some of the second content;

designating the third 2D coordinate area as part of a layout of the second group; and designating the fourth 2D coordinate area as part of the layout of the second group; and associating the layout of the second group with the second section of the first page and with the second section of the second page.

7. The method as recited in claim 6, further comprising identifying other pages with at least one of the layout of the first group or the layout of the second group.

8. The method as recited in claim 6, wherein the layout of the first group and the layout of the second group are associated with the first section and the second section prior to associating another layout with another section designated in the source document after the designating the first section of the first page and the first section of the second page.

9. The method as recited in claim 5, wherein the designating the first section of the first page and the designating the second section of the first page is based on at least one of determining a predominant line spacing on the first page, determining that segments of the first content are separated by a distance exceeding a minimum distance, or a font characteristic of the first content.

10. The method as recited in claim 5, wherein the assigning the first section of the first page and the first section of the second page to the first group is based at least in part on (i) a number of columns detected for the first section of the first page and for the first section of the second page, (ii) column widths of the columns of the first section of the first page and column widths of the columns of the first section of the second page, or (iii) a combination thereof.

11. The method as recited in claim 5, wherein the receiving the first content and the second content comprises identifying text-based content and image content, the method further comprising, grouping the text-based content into words and lines on the first page and the second page.

12. The method as recited in claim 11, further comprising applying different weights to the text-based content and the image content, and wherein the text-based content is associated with a higher weight than a weight of the image content.

13. The method as recited in claim 5, further comprising:
determining a first sum of the number of times that the first discrete portion contains at least some of the first content and the number of times that the third discrete portion contains at least some of the second content;
determining a second sum of the number of times that the second discrete portion contains at least some of the first content and the number of times that the fourth discrete portion contains at least some of the second content;
comparing the first sum to the threshold; and
comparing the second sum to the threshold.

14. The method as recited in claim 5, further comprising determining a typographical size of text to be included in the layout of the first group based on converting known dimensions of the first and second discrete portions to a typographical unit of measurement including at least one of picas or points.

15. A system comprising:
one or more processors; and
memory storing computer-executable instructions that, when executed by the one or more processors, cause the one or more processors to perform acts comprising:
receiving first content from a first page and second content from a second page of a source document;
determine one or more section breaks associated with the first page and the second page based at least in part on one or more heuristics and a line spacing distance associated with the first page and the second page;
designating, based at least in part on the one or more section breaks, a first section of the first page and a second section of the first page along a first direction of the first page;
designating, based at least in part on the one or more section breaks, a first section of the second page and a second section of the second page along a first direction of the second page;
assigning the first section of the first page and the first section of the second page to a first group;
for the first group:
dividing the first section of the first page into a first plurality of discrete portions to form a first grid having a defined density of discrete portions within a first area of the first section of the first page, the first plurality of discrete portions that form the first grid including at least a first discrete portion and a second discrete portion, the first discrete portion associated with a first two-dimensional (2D) coordinate area of a display and the second discrete portion associated with a second 2D coordinate area of the display;
dividing the first section of the second page into a second plurality of discrete portions to form a second grid having the defined density of discrete portions within a second area of the first section of the second page, the second plurality of discrete portions that form the second grid including at least a third discrete portion and a fourth discrete portion, the third discrete portion associated with the first 2D coordinate area and the fourth discrete portion associated with the second 2D coordinate area;
determining the first discrete portion contains at least some of the first content;
determining the third discrete portion contains at least some of the second content;
determining the second discrete portion contains at least some of the first content;
determining the fourth discrete portion contains at least some of the second content;
designating the first 2D coordinate area as part of a layout of the first group; and
designating the second 2D coordinate area as part of the layout of the first group; and
associating the layout of the first group with the first section of the first page and with the first section of the second page.

16. The system as recited in claim 15, the acts further comprising:
assigning the second section of the first page and the second section of the second page to a second group;
for the second group:
determining a fifth discrete portion of the second section of the first page and a sixth discrete portion of the second section of the first page, the fifth discrete portion associated with a third two-dimensional (2D) coordinate area of the display and the sixth discrete portion associated with a fourth 2D coordinate area of the display;
determining a seventh discrete portion of the second section of the second page and an eighth discrete portion of the second section of the second page;
determining the fifth discrete portion contains at least some of the first content;
determining the seventh discrete portion contains at least some of the second content;
determining the sixth discrete portion contains at least some of the first content;
determining the eighth discrete portion contains at least some of the second content;
designating the third 2D coordinate area as part of a layout of the second group; and
designating the fourth 2D coordinate area as part of the layout of the second group; and associating the layout of the second group with the second section of the first page and with the second section of the second page.

17. The system as recited in claim 16, the acts further comprising identifying other pages with at least one of the layout of the first group or the layout of the second group.

18. The system as recited in claim 15, wherein the assigning the first section of the first page and the first section of the second page to the first group is based at least in part on (i) a number of columns detected for the first section of the first page and for the first section of the second page, (ii) column widths of the columns of the first section of the first page and column widths of the columns of the first section of the second page, or (iii) a combination thereof.

19. The system as recited in claim 15, wherein the receiving the first content and the second content comprises identifying text-based content and image content, the acts further comprising, grouping the text-based content into words and lines on the first page and the second page.

20. The system as recited in claim 19, the acts further comprising applying different weights to the text-based content and the image content, and wherein the text-based content is associated with a higher weight than a weight of the image content.

* * * * *